United States Patent [19]

Rogers et al.

[11] 4,018,656
[45] Apr. 19, 1977

[54] THERMAL SOFTENING AND DISTILLATION BY REGENERATIVE METHOD

[75] Inventors: Alfred N. Rogers, Pleasanton; Leon Awerbuch, San Francisco; Jack Z. Abrams, San Rafael, all of Calif.

[73] Assignee: Bechtel International Corporation, San Francisco, Calif.

[22] Filed: Sept. 3, 1974

[21] Appl. No.: 502,465

[52] U.S. Cl. .................................. 203/11; 203/80; 202/173; 202/234; 159/2 MS
[51] Int. Cl.² ........................................ B01D 3/06
[58] Field of Search ................ 203/7, 11, 280, 74, 203/77, 88; 202/173, 174, 234; 159/2 MS, 17, 46, 47, DIG. 13

[56] References Cited

UNITED STATES PATENTS

| | | | |
|---|---|---|---|
| 3,329,583 | 7/1967 | Othmer | 202/185 |
| 3,334,024 | 8/1967 | Zahavi | 203/7 |
| 3,392,089 | 7/1968 | Guptill | 203/7 |
| 3,401,094 | 9/1968 | Lindsay | 203/7 |
| 3,514,375 | 5/1970 | Dambrine | 159/2 MS |
| 3,607,663 | 9/1971 | Vandenberg | 159/2 MS |
| 3,692,634 | 9/1972 | Othmer | 203/7 |
| 3,697,382 | 10/1972 | Porteous | 203/11 |
| 3,734,835 | 5/1973 | Spicacci | 203/11 |
| 3,948,734 | 4/1976 | Kohl | 159/2 MS |

Primary Examiner—Hiram H. Bernstein
Attorney, Agent, or Firm—Townsend and Townsend

[57] ABSTRACT

A system for softening of water in a manner to minimize heat requirements in the water softener unit of the system. Flashed water vapor from a flash box coupled to the downstream end of the softener unit is used to preheat incoming hard feed water by directly contacting the feed water in respective preheating chambers upstream of the softener unit. The system is suitable for use in a distillation plant to produce potable water.

21 Claims, 6 Drawing Figures

THERMAL SOFTENING AND DISTILLATION BY REGENERATIVE METHOD

This invention relates to improvements in the softening of water and, more particularly, to a water softening system in which incoming feed water is preheated to minimize heat requirements.

BACKGROUND OF THE INVENTION

Softening of water by thermal action is a well-established principle and commercial equipment for accomplishing this purpose is available through a number of companies, such as Graver Water Conditioning Company of Union, N.J. Generally, this type of equipment requires a large volume of steam, i.e., great amounts of heat energy to effect the softening of large volumes of water; thus, such equipment is typically used where waste steam is available. Flash distillation of water is also old in the art for the purification of the water itself. Impure water is heated by steam in a prime or brine heater and is introduced into a series of flash chambers at successively lower pressures, thereby flashing to corresponding lower temperatures. The water vapor, generated by the flashing in each chamber, is condensed on the outer surface of metal tubing through which the impure water is passed. The heat given up by the condensing vapor serves to heat the impure water by flowing countercurrent to the direction of flow of the flashing liquid. The impure water is thus heated almost to the desired purifying temperature and additional heat necessary to initiate flashing is provided in the prime or brine heater.

This particular process privides a stream of purified distillate which is caught in trays located beneath the tubular condensers and conducted by suitable pipes to the outside. However, preheating of impure water as it flows through metal tubing toward the heater causes scale to form on the inner surface of the tubing, thereby inhibiting proper waterflow therethrough.

In U.S. Pat. No. 3,329,583, issued to D. F. Othmer, a water purification technique is disclosed. In this patent, the flashing of water is used in two different ways. In the first way, the water is flashed to heat hard or impure water flowing through tubing on its way to a prime or brine heater. In the second way, flashed water vapor is urged into direct contact with relatively pure water, not to heat the latter but to recover water vapor caused by the water flashing to thereby increase the volume of the pure water itself. This pure feed water is then collected and used or stored.

SUMMARY OF THE INVENTION

The present invention is directed to a system and method for the thermal softening of water in such a way that the heat requirements of the method are significantly lower, for example, by 75% or more, than those of conventional thermal softening methods. The invention involves multi-stage flashing of softened hot water and the use of the heat, obtained during flashing, to contact directly and thereby preheat incoming hard or impure water to a temperature at least approaching the required or desired softening temperature. It differs from prior multi-stage flash techniques, such as those used in desalination, in that this invention provides for the direct contact of the flashed water vapor with the impure or hard feed water rather than contacting heat transfer surfaces, such as tubing or the like, for heating the feed water passing therethrough.

The present invention is applicable to process streams that are very high in hardness. However, it can also be used on water of considerable higher quality. Its use will, in all cases, reduce the total amount of liquid waste. It can be used along with conventional lime soda softening or with ion exchange softening. In both of these cases, it will reduce chemical consumption and will help to solve waste disposal problems in that it allows the use of distillation methods for concentration of brines. Without prior softening, these brines would cause scaling when put under distillation conditions. Thus, this invention will allow the recovery of distilled water from waste streams. The invention can be applied to the following streams: cooling tower blowdown, boiler blowdown, make-up water, waste, sulphur dioxide scrubbing streams for fossil fueled plants, and desalination feed.

The degree of softening achieved by the present invention depends upon the temperature to which the water is raised. The process involves the softening of hard water by raising its temperature to a point at which a fraction of its hardness will precipitate, thereby minimizing the heat requirement by flashing the softened water and condensing the resulting vapor, stepwise, in the incoming feed water. The feed water is introduced into the system at a point of lowest operating temperature. The feed water is then preheated, both by vapor and finally by steam, by direct contact therewith without using metallic heat transfer surfaces. The incoming feed water, due to its relatively low temperature, condenses the flashed vapor into the feed water, rather than into the end product from the softening unit of the system. Thus, heat is not wasted by the use of external cooling media and a stream of softened feed water is produced which can be drawn off and used in any one of a number of well-known ways.

The present invention has for its main purpose, therefore, to preheat incoming impure or hard feed water by direct contact therewith of flashed water vapor of high quality to preheat the feed water gradually so as to permit relatively easy precipitation because of the higher temperatures of the salts, impurities and the like in the feed water, yet precipitation of such impurities will not occur in tubing, as used in the prior art, which would clog up and prevent proper operation of the system.

An object of the invention is to provide a system and method of the type described wherein the preheating and flashing chambers can be in separate structures or in the same structure to assure proper preheating of the feed water and minimize space requirements.

Other objects of this invention will become apparent as the following specification progresses, reference being had to the accompanying drawings for schematic illustrations of the invention.

Figure 1:
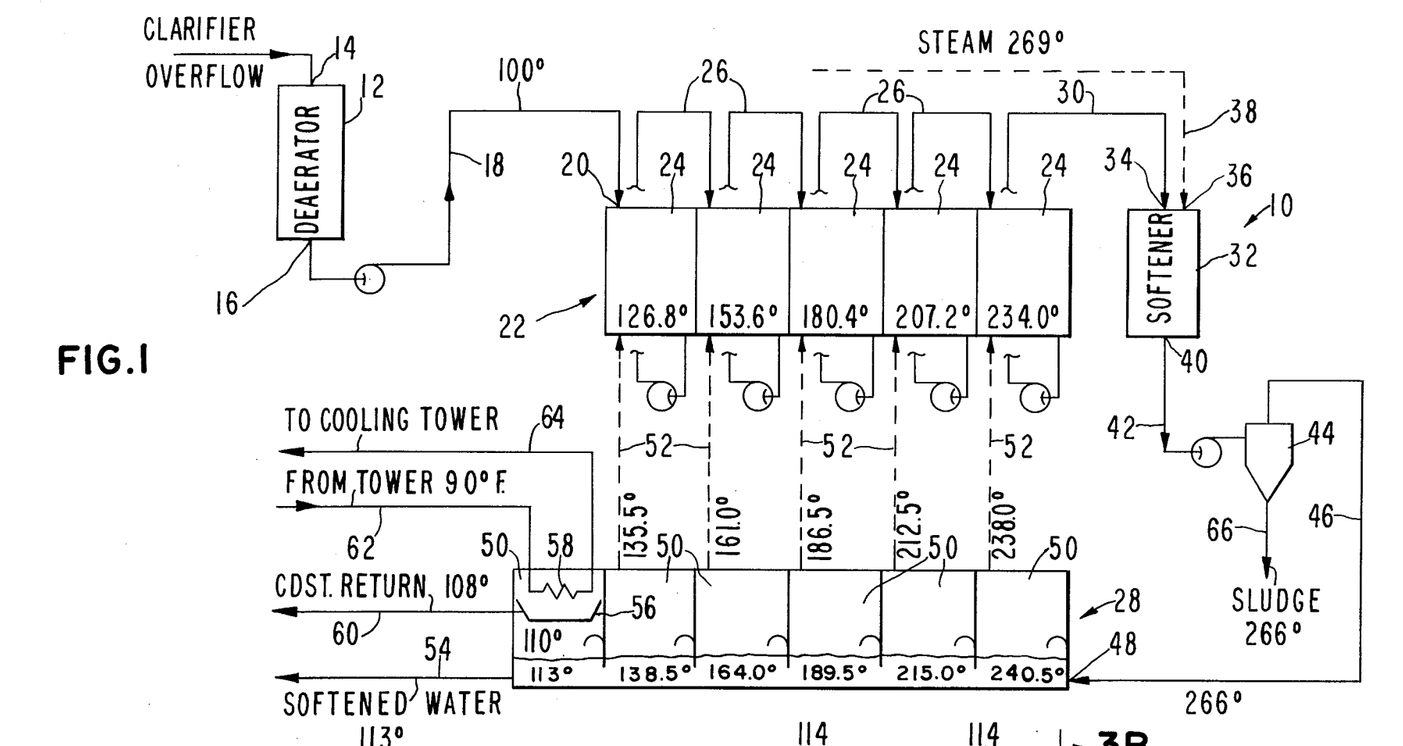
FIG. 1 is a schematic view of a system for softening of hard water using a flashing technique in accordance with the present invention.

The water softening system of the present invention, denoted by the numeral 10, is shown in FIG. 1 and includes a de-aerator 12 having an input 14 for receiving feed water to be softened, such as hard water containing dissolved calcium and magnesium salts. The feed water exits from the de-aerator at the outlet 16 thereof and passes by a line 18 to the inlet 20 of a feed preheater 22 having a plurality of chambers 24 coupled in series with each other. Feed water is pumped successively from each chamber to the next adjacent chamber and each pair of chambers 24 is interconnected by a line 26 having a pump (not shown) therein. In each chamber 24, the feed water is brought into direct and intimate contact with flashed water vapor from a corresponding chamber of a multiple-chamber flash box 28 described hereinafter.

The downstream chamber 24 is coupled by a line 30 to a water softener unit 32 having an inlet 34 for receiving the feed water. Unit 32 also has a second inlet 36 for receiving high pressure steam from a line 38 coupled to an external steam source (not shown).

Softener unit 32 has an outlet 40 coupled by a line 42 to the inlet of a concentrator or separator 44, such as a cyclone separator, whose output is coupled by a line 46 to the inlet 48 of flash box 28. The output of separator 44 is softened water which enters the first chamber 50 of flash box 28 where its pressure is reduced so as to vaporize a fraction of the water. This cools the remaining water entering the first chamber 50 and the vapor generated therein flows to a corresponding chamber 24 through a line 52. The vapor condenses on the feed water in chamber 24 to raise its temperature and thereby preheat it before it arrives at water softener until 32.

Flash box 28 has additional chambers 50 which are all coupled in series with each other and are connected by corresponding lines 52 to respective chambers 24 of feed preheater 22. Each succeeding chamber 50 receives the softened water from the preceding chamber 50 and causes a reduction in its pressure, whereby a fraction of the water is flashed in the form of vapor to respectively cool the remaining water. This cooling-vaporizing process of the hot softened water continues from one chamber 50 to the next chamber in a stepwise fashion until the softened water finally emerges from flash box 28 along a line 54 at a significantly reduced temperature.

The flash box chamber 50 immediately upstream of line 54 has a tray 56 therein for collecting the condensate from a coil 58 which intercepts the vapor liberated during flashing in such chamber. This condensate is actually distilled water and leaves the chamber through a separate line 60 and provides a valuable product which can be used for process purposes in a plant associated with system 10. For instance, it can be used as boiler feed water or as potable water. The feed water for coil 58 is directed along a line 62 and includes water or other liquid at a certain temperature, such as 90° F. The outlet end of coil 58 is coupled by a line 64 to a cooling tower (not shown) or the like.

In operation, hard feed water to be softened is directed through the de-aerator and enters the inlet 20 of preheater 22 at a certain temperature, such as 100° F. The feed water is contacted by the vapor generated in the corresponding chamber 50 of flash box 28 so that the temperature of the feed water is elevated to a certain value, such as 126.8° F. The feed water then continues on to the next chamber where its temperature is elevated to 153.6° F. by direct contact with the water vapor from the next adjacent chamber 50 of flash box 28.

As the feed water progresses through the remaining chambers 24 of preheater 22, the temperature progressively increases by direct contact with flashed water vapor from corresponding chambers 50. The temperatures of the feed water in the remaining chambers 24 reach certain values, such as 180.4° F. in the third chamber to 207.2° F in the fourth chamber and to 234.0° F. in the fifth chamber. The preheated feed water is then directed into softener unit 32 where it is contacted by the steam directed into inlet 36. In softener unit 32, the feed water is heated to a temperature of about 266° F. At this temperature, a substantial fraction of the dissolved calcium and magnesium salts are precipitated. The precipitate and the softened water are directed through separator 44 and the precipitates are collected as sludge and passed out of separator 44 along a line 66. The softened water then proceeds along line 46 to the first chamber 50 where its pressure is reduced so as to vaporize a fraction of the water, thereby cooling the remaining water to about 240° F. The softened water is progressively cooled by the reduction of pressure in the succeeding chambers 50, such as to temperature values of 215° F., 189° F., 164° F., 138° F., and 113° F. The flashed vapor from the various chambers 50 are, for example, at temperatures of 238° F., 212° F., 186° F., 161° F., and 135° F., respectively, as they enter and directly contact the feed water in respective chambers 24. Condensate from tray 56 leaves the same at a temperature of about 108° F.

In the foregoing example, the process carried out by the use of system 10 requires less than one-fourth the heat input required when unheated feed water at 100° F. flows directly into softener unit 32 and contacts the steam from line 38. Thus, the desired results are obtained with system 10 by the direct contact of the flashed water vapor with the incoming feed water to preheat the latter so as to cause a substantial portion of the dissolved calcium and magnesium salts therein to be readily precipitated from the liquid fraction. Also, the softened water is kept at an elevated temperature as it is separated from the precipitates.

Figure 2:
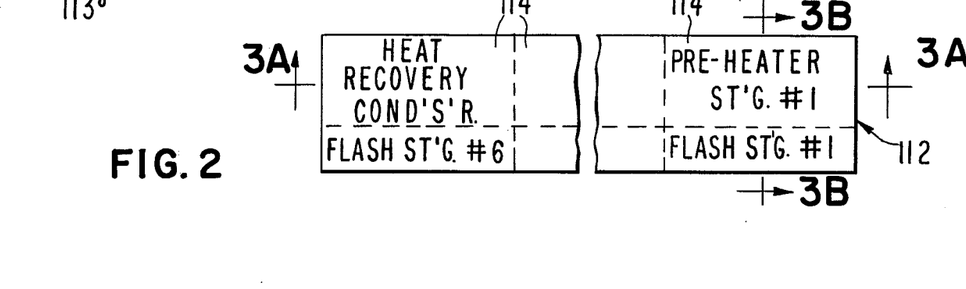
FIG. 2 is a schematic view showing a portion of an improvement for the system of FIG. 1 including a flash box and preheater combined into a single structure.
Figures 3A, 3B, 4:
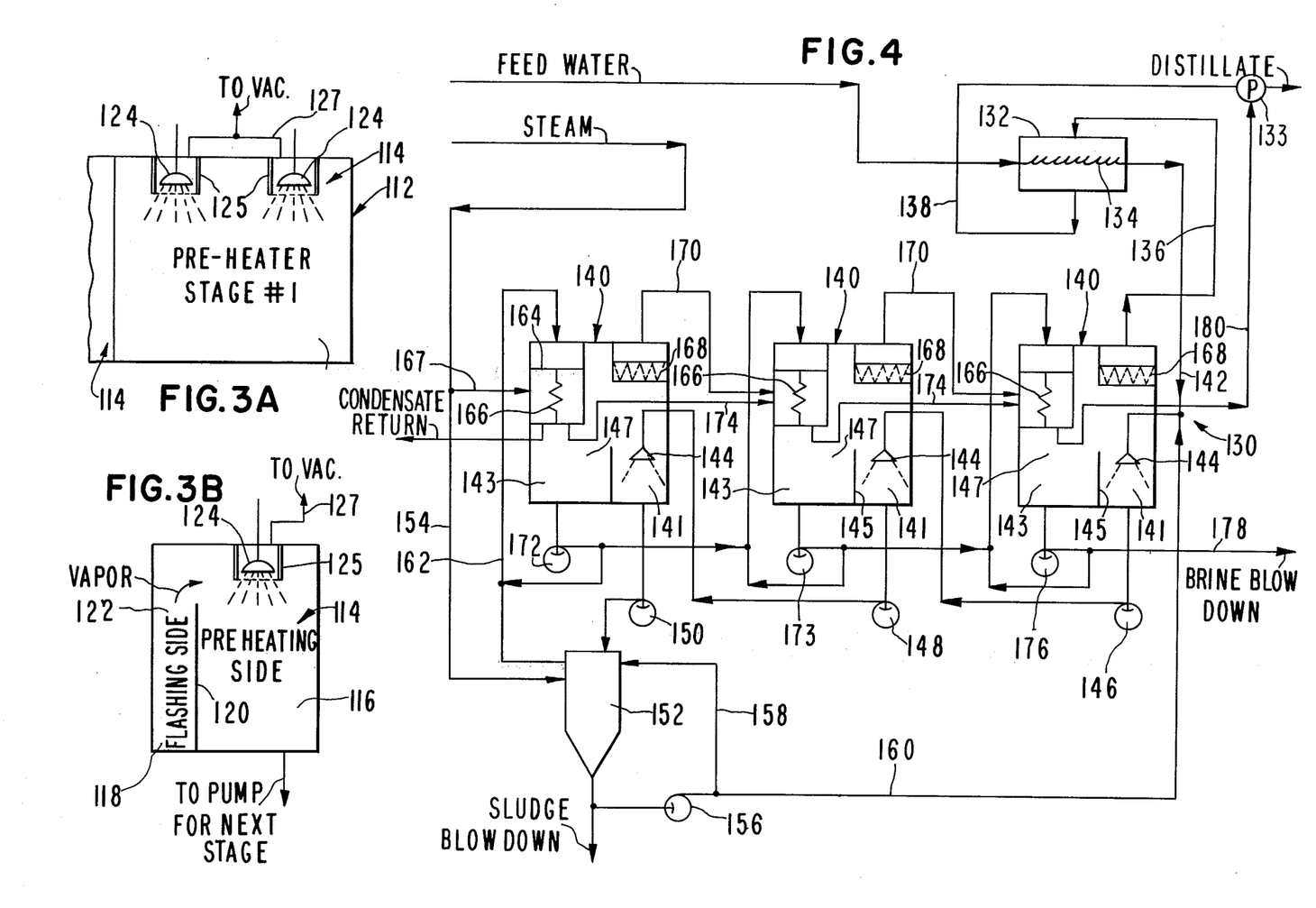
FIG. 3a is a view showing the interior of the flash box of FIG. 2.
FIG. 3b is a cross-sectional view taken along line 3b—3b of FIG. 2.
FIG. 4 is a schematic view of a vertical tube evaporator using the teachings of the present invention.

FIGS. 2, 3a and 3b represent an improvement in system 10 wherein the flash box and preheater are combined into a single structure 112 having a plurality of compartments 114 arranged in series relationship with each other. In FIG. 1, the flash box and the preheater are in separate structures. In FIGS. 3a and 3b each compartment 114 has a preheating chamber 116 and a flash chamber 118 separated by a partition 120, and each flash chamber has an open top 122 communicating with the interior of the adjacent preheating chamber 116. Each preheating chamber 116 is provided with one or more spray nozzles 124 for spraying the incoming feed water into chamber 116 so as to assure intimate contact with the flashed water vapor passing into chamber 116 through the adjacent open top 122 of the corresponding chamber 118. Each nozzle 124 is surrounded by a cylindrical collar 125, and the space between each nozzle 124 and its collar is coupled by a line 127 to a vacuum source.

The feed water at the outlet of the last or downstream compartment 114 passes to softener unit 32, and the outlet of softener unit 32 passes through separator 44 whose outlet is connected to the first or upstream flash chamber 118. Thus, the system of FIGS. 2, 3a and 3b operates essentially in the same manner as that shown in FIG. 1.

It is possible to reduce the heat requirements of system 10 even further by increasing the number of chambers 24 and 50. For such increased number of chambers, less and less heat is required in the water softener unit 32. By directly contacting the flashed water vapor with the incoming hard feed water, there is no scale formed on interior surfaces of pipes and the like as in the prior art yet the feed water is properly preheated to minimize the heat requirements in softner unit 32.

The sludge concentrated in separator 44 contains crystals of precipitated scale-formers. Preferably, only a fraction of this slugde will be discarded to waste. The remaining sludge will be recirculated, partly to softener unit 32 and partly to the incoming impure feed water from the clarifier. The recycled sludge provides "seed" crystals on which additional hardness compounds (scale-formers) can precipitate, thereby accelerating their precipitation and permitting the precipitated hardness to grow to crystals of a larger size, thus improving the ease of separating them from the softened water. At start-up, seeds are initially supplied by adding to the feed water finely ground gypsum and/or calcium carbonate.

The reduced pressure in the spaces between nozzles 124 and collar 125 prevents the flashed water vapor from impinging directly on the nozzles which, if heated excessively, would cause scales to deposit in and clog the nozzles. This feature also forces any non-condensable gases contained in the flashed water vapor to pass through a curtain of comparatively cool water to strip from the non-condensables a fraction of their contained moisture prior to discharge of the gases to the vacuum system.

The teachings of the invention can be used in the distillation of brackish or saline water to produce potable water. If brackish or saline feed water contains appreciable hardness, it is necessary to soften the feed water prior to distillation in order to avoid scale deposition, particularly on heat transfer surfaces. If pre-treatment is limited to acidification followed by decarbonation to destroy carbonates, then the calcium sulfate content of the feed water may impose a serious limitation on maximum plant temperature and brine concentration. Partial or complete pre-softening of the feed water to the distillation plant can guarantee scale-free operation, even at fairly elevated temperatures. Such pre-softening will decrease both capital and operating costs.

The present invention can be used to soften hard water fed to a distillation plant with only minimal increase in size of the distillation plant and at no increase in operating cost over that of the distillation process itself. The invention, as shown in FIG. 4, includes a system 130 which comprises a modification of the conventional distillation process so as to heat and vaporize an impure aqueous feed water while simultaneously precipitating therefrom its scale-forming constituents so as to minimize the deposition of scale on the heat transfer surfaces of the plant.

System 130 relates to a vertical tube evaporator (VTE) process performed with a number of VTE effects, three of which are shown in FIG. 4 and denoted by the numerals 140, 149 and 151, although a greater or smaller number of effects can be used. Feed water containing scale-forming compounds enters heat exchanger 132 where it passes through one or more heat exchange tubes 134 where it is heated by the condensation of water vapor, produced as hereinafter described and entering heat exchanger 132 through line 136.

The feed water, thus preheated in heat exchanger 132, is injected into effect 151 by way of line 142 and spray nozzle 144. The spray of preheated feed water is directed into one chamber 141 of effect 151 and contacts water vapor generated in a corresponding evaporator 166 and directed into a second chamber 143, chambers 141 and 143 being separated by a partition 145 and communicating with each other at an opening 147 at the top of the partition. Thus, the water vapor is fed into intimate, direct contact with the sprayed feed water issuing from the corresponding spray head 144. This causes a further increase in the temperature of said feed water. An excess of water vapor is generated by evaporator 166. Only a portion of this water vapor mixes with the sprayed feed water in chamber 141. The remaining vapor passes through a demister 168 and then through heat exchanger 132 which condenses the vapor to form a distillate which is carried off by a pump 133 to a storage tank or to a point of use. The parameters of the system are properly selected to assure the excess of water vapor as described above.

A pump 146 delivers the heated feed water in chamber 141 of effect 151 to the spray nozzle 144 of the next effect 149, where the foregoing process is repeated. Again, the corresponding evaporator 166 generates an excess of water vapor, a portion of which mixes with and preheats the feed water from the spray head 144 of effect 149 and the remainder passes through a demister 168 and is directed into the evaporator 166 of effect 149. A pump 148 transfers the feed water from chamber 141 of effect 149 to the next effect 140 for further heating by the condensation of vapor in the manner described with respect to effects 149 and 151.

A pump 150 delivers the hot feed water to a contactor-settler 152 where steam from a boiler, admitted through line 154, raises it to a maximum feed temperature. Residence of the hot feed water in contactor-settler 152 encourages the growth of crystals of precipitated scaling constituents. The settled crystals form a sludge at the bottom and a portion of the sludge is rejected to waste. The balance of the sludge is withdrawn by pump 156 and split into two streams, one recirculated through line 158 back to contactor-settler 152, the other stream through line 160 back to join the warmed feed water entering spray nozzle 144 of effect 151, the circulation of the sludge serving to provide nuclei for the deposition of scale-forming constituents from the feed water as the temperature of the feed water is increased.

Clear overflow from contactor-settler 152, softened as a result of the hardness precipitation, flows through line 162 into evaporator 166 of effect 140 where it flows over tube sheet 164 and down through the tubes of the evaporator. Steam from an external source enters through line 167 and contacts the outside of tubes 166 so as to provide heat adequate to evaporate a portion of the hot feed water flowing therethrough. The water vapor generated thereby contacts the feed water entering effect 140 via the spray nozzle 144 thereof so as to preheat the feed water in a manner hereinbefore described. That portion of the water vapor which is not condensed in such preheating exchanger escapes from effect 140 by way of a demister 168 and passes via line 170 to the next effect 149 to function as described below.

The unvaporized portion of the feed water is partly recycled by a pump 172 back to the top of effect 140 so as to evaporate therefrom a further portion of its wear content, the balance of the feed water flowing to effect 149, where it passes down its tubes 166 for further evaporation in the manner as previously described for effect 140. The heat for this further evaporation is contributed by condensation, on the outside of the tubes 166 of effect 149, of the vapor leaving demister 168 and delivered via line 170 as heretofore described. Steam condensed on the heat exchange tubes 166 of effect 140 flows through line 174 to effect 149 where it joins water vapor condensed in effect 149 (or as a condensate return).

The above process is repeated in identical fashion in effect 151 from which the feed water concentrate is discharged to waste by way of pump 176 and line 178. Part of this blowdown can be recycled by way of pump 146 to achieve higher concentration ratios. The combined condensates leave effect 151 through line 180 so as to join the distillate stream previously described as flowing through line 138, thereby constituting the product stream of purified water leaving system 130.

The foregoing description shows the feed stream descending in the heat exchange tubes of the respective effects. Alternatively, the feed water may be delivered to the bottom of the tubes in each effect so as to jet up through the tubes as a two-phase mixture, thereby eliminating the need for pumps 172, 173 and 176. The present invention can be applied to all other evaporation systems, such as horizontal tube evaporation, vapor compression and multi-stage flash.

Figure 5:
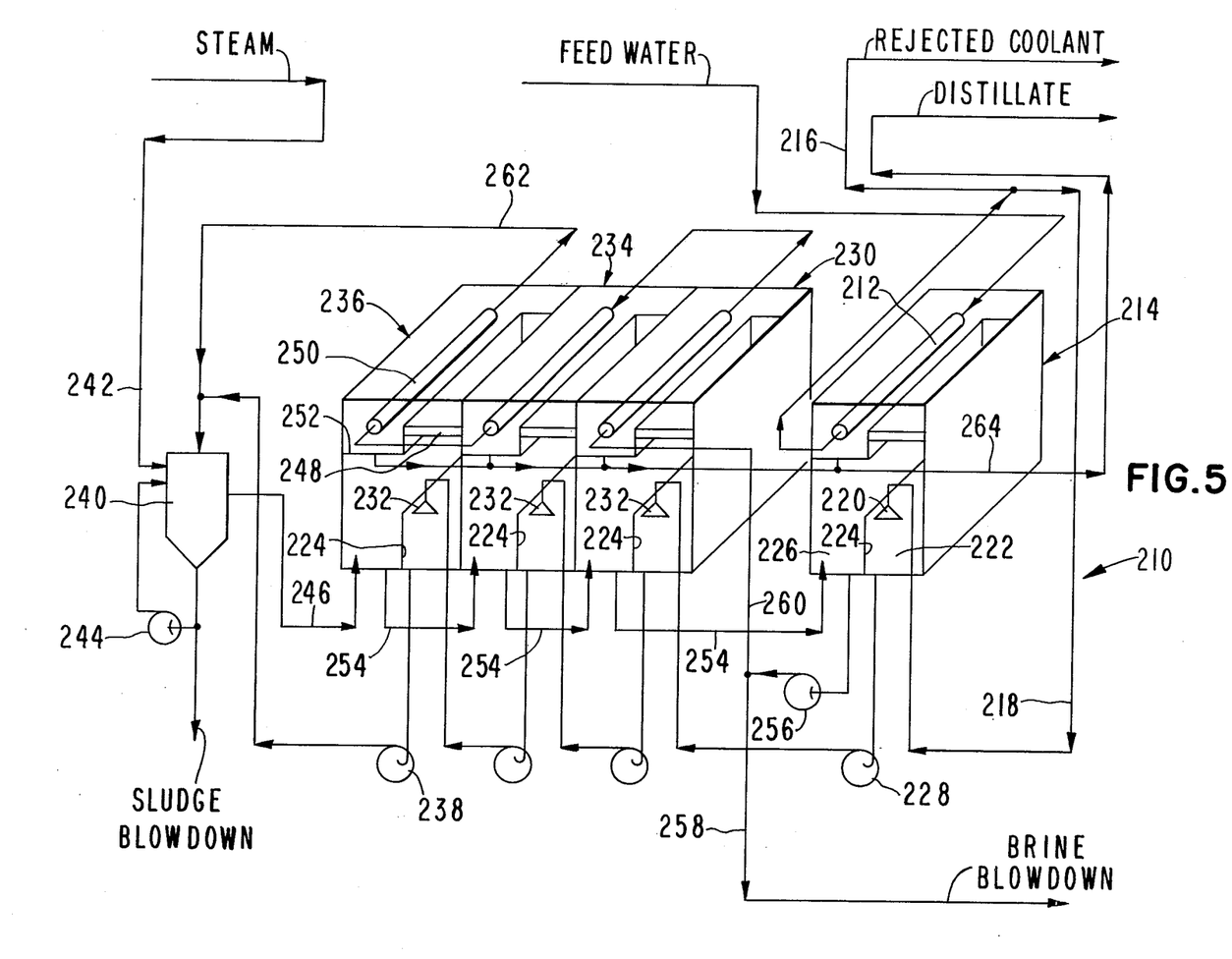
FIG. 5 is a perspective view of a distillation system using the multi-stage flashing process of this invention.

The application of the present invention to a multi-stage flash (MSF) process system 210 can be understood by reference to FIG. 5. In this system, feed water containing scale-forming compounds enters a tube 212 in a heat reject chamber 214. For simplicity, a single tube 212 is shown although, in a commercial plant, a group of tubes (tube bundle), having a common entrance plenum and a common exit plenum, would normally be used. In tube 212, the feed water is warmed by heat exchange with water vapor condensing on the outside of the tube, as hereinafter described. A fraction of the warmed feed water is rejected from the plant via line 216, the balance being injected into chamber 214 through line 218 terminating in spray nozzle 220. The sprayed water is preheated by direct contact with flashed water vapor, produced as hereinafter described, and descends into a first chamber section 222 separated by a partition 224 from a second chamber section 226. The water is then withdrawn from chamber section 222 by pump 228, which discharges the water into a succeeding chamber 230 via a spray nozzle 232.

In similar fashion, the feed proceeds from chamber 230 to succeeding chambers 234 and 236, each such chamber having first and second chamber sections 222 and 226 separated by a partition 224. The feed water is heated in chamber sections 222 of succeeding chambers to successively higher temperatures by the direct-contact condensation of hot flashed water vapor. From the chamber section 222 of chamber 236, pump 238 delivers the water to softener unit 240 where steam injected through line 242 from a source (not shown) heats the water by direct contact to the maximum temperature of the system.

The scale-forming compounds, precipitated in softener unit 240, are discharged in part as sludge blowdown and the balance is recycled to the softener unit by pump 244 to serve as nuclei for the precipitation of hardness from subsequently delivered feed water. Clarified softened feed water is discharged from the softener unit through line 246 and flashes into chamber section 226 of chamber 236. The water vapor flashed from the softened feed water crosses the adjacent partition 224. A portion of the water vapor condenses on the incoming feed water spray from the adjacent spray nozzle 232. The uncondensed fraction of the water vapor passes through the demister 248 and condenses on the outside of the adjacent condenser tube 250, the function of which is described below. The condensate accumulates in trough 252.

Residual feed water, remaining after flashing, flows via line 254 to chamber section 226 of chamber 234 where the flashing process is repeated at a lower temperature and pressure. The feed water residue proceeds from chamber to chamber, each in turn at a lower temperature and pressure, until it is finally withdrawn from chamber 214 by a pump 256. The pump discharge splits into two streams, of which one is discarded as brine blowdown via line 258 while the other is recycled through system 210 for the recovery of an additional fraction of its water content.

The feed water, thus recycled through system 210, is delivered by line 260 to the interiors of condenser tubes 212 and flows countercurrent to the flashing brine flowing through the system, serving to condense the flashed water vapor and thereby experiencing a rise in temperature, as hereinbefore described. The brine, thus preheated, passes through line 262 to join the fresh (i.e., not yet recycled) feed water as the latter enters the softener unit. The water vapor condensed on the condenser tubes 212 in each of the foregoing chambers leaves the plant via a common line 264 and constitutes the end product of the system.

The recycling of partially evaporated feed water, described above as a method for the further recovery of distilled water, is made possible by the present invention inasmuch as the prior gradual heating of the original feed water to a high temperature by direct contact heating has removed a substantial portion of its contained scale-forming constituents.

The above description embraces a single chamber feed water preheater, commonly known as the heat rejection section, and a triple chamber final heater-plus-flasher, known as the heat recovery section. It is understood that the heat rejection section may include several chambers, disposed as herein described. Also, the heat recovery section may contain more or fewer chambers. In conventional MSF plants which do not include the softening improvements herein described, the number of chambers (stages) will range from four to 50 in the heat recovery section and from one to four in the heat rejection section.

Thus, it is seen that the present invention provides an improved process which simultaneously softens a hard water feed and distills therefrom a substantial fraction of its water content in the form of essentially pure distillate, all without danger of significant formation of scale on the heat transfer surfaces.

We claim:

1. A method of treating water having dissolved impurities therein with at least certain of the impurities having solubilities which vary inversely with temperature comprising: directing a continuous flow of impure water along a first path; preheating said impure water as it flows along said first path; urging said preheated water through a region at which said water is heated to a temperature sufficient to cause at least some of said certain impurities therein to be precipitated; separating the precipitated impurities from said water to thereby purify the latter; directing the purified water along a second path; and reducing the pressure of said purified water as it flows along said second path to cause a portion of said purified water to flash into a vapor, said preheating step including directing said vapor into said first path and into direct, admixing contact with said impure water flowing therethrough to heat the latter.

2. A method as set forth in claim 1, wherein the step of directing the impure water along the first path includes spraying the water into a chamber, said preheating step including directing the water vapor into the water spray in said chamber.

3. A method as set forth in claim 2, wherein is included the step of evacuating the space immediately surrounding the location at which the impure water is sprayed into said chamber.

4. A method as set forth in claim 1, wherein said first path is defined by a series of discrete, interconnected chambers, said preheating step including directing the water vapor into each chamber, respectively.

5. A method as set forth in claim 4, wherein said second path is defined by a series of discrete, interconnected chambers, there being a chamber of the second path for a corresponding chamber of said first path, said pressure-reducing step including progressively lowering the pressure of the purified water as it flows through successive chambers of the second path, there being a flashing of the purified water in each chamber, respectively, of the second path, said preheating step including directing the flashed water vapor of each chamber of the second path into the corresponding chamber of the first path.

6. A method as set forth in claim 1, wherein is included the step of placing the first and second paths in side-by-side relationship with the paths being separated by an imperforate zone and in fluid communication with each other adjacent to the uppermost margin of the zone.

7. A method of softening hard water having dissolved salts therein with at least certain of the salts having solubilities which vary inversely with temperature comprising: providing a series of first interconnected chambers defining a first fluid flow path; providing a number of second interconnected chambers defining a second fluid flow path; placing each second chamber in fluid communication with a respective first chamber; directing a flow of hard water successively through said first chambers; urging said flow of hard water through a softening region at which said hard water is heated to a temperature sufficient to cause at least some of said certain dissolved salts therein to be precipitated; separating the precipitated salts from said water to purify the latter; directing said purified water successively through said second chambers; progressively reducing the pressure of said purified water as it flows through said second chambers to cause said purified water to flash into a vapor in each second chamber, respectively, and directing said vapor of each second chamber the corresponding first chamber and into direct, admixing contact with said hard water flowing therethrough to preheat said hard water before it reaches said region.

8. A method as set forth in claim 7, wherein said step of directing said flow of hard water through said first chambers includes spraying the hard water into each first chamber, respectively.

9. A method as set forth in claim 7, wherein said providing steps include placing each first chamber immediately adjacent to the respective second chamber with each second chamber being in fluid communication with the adjacent first chamber at a location near the upper margin of a zone separating the same.

10. A method of forming a distillate comprising: directing a stream of incoming feedwater to be treated through a series of preheating regions; directing the feedwater through a treating area after the feedwater has passed through the regions; softening the feedwater at said treating area and separating precipitated impurities from the softened feedwater; forming water vapor adjacent to each region, respectively, in response to the flow of softened feedwater from said treating area; directing a portion of the water vapor of each region into direct contact with the incoming feedwater flowing therethrough to preheat the incoming feedwater; directing the remainder of the water vapor of each region to a location spaced from the path of incoming feedwater therethrough; and condensing the remainder of the water vapor at said location to form a distillate.

11. A method as set forth in claim 10, wherein said water vapor is formed by evaporation.

12. A method as set forth in claim 10, wherein said water vapor is formed by flashing.

13. A method as set forth in claim 10, wherein said step of directing the feedwater through said treating area includes precipitating scale-forming compounds from the feedwater, and including the step of moving said precipitated scale-forming compounds into said feedwater upstream of said treating area to serve as nuclei for deposition of said compounds thereon.

14. Apparatus for treating water having dissolved impurities therein with at least certain of the impurities having solubilities which vary inversely with temperature comprising: means defining a series of first interconnected chambers for successively receiving a flow of water having said dissolved impurities therein; means coupled with the downstream end of said series of first chambers for heating the waterflow therefrom to a temperature sufficient to cause at least some of said certain impurities therein to be precipitated; means coupled with said heating means for separating the precipitated impurities from said water therefrom to thereby purify said water; means defining a series of second interconnected chambers for successively receiving a flow of said purified water from said separating means, there being a second chamber for each first chamber, respectively; and a fluid flow path interconnecting each second chamber with a respective first chamber to permit flashed water vapor generated in said second chamber to flow into direct, admixing contact with said impure water flowing through said first chamber to thereby cause said impure water to be preheated by said water vapor before it reaches said heating means.

15. Apparatus as set forth in claim 14, wherein is included a spray nozzle for each first chamber, respectively, for spraying the impure water therein.

16. Apparatus as set forth in claim 14, wherein is included a housing having means dividing the same into a number of discrete compartments, each compartment having a partition dividing it into two sections, the sections of each compartment defining a first chamber and the corresponding second chamber and being in fluid communication with each other near the upper margin of the corresponding partition.

17. A distillation system comprising: a plurality of effects in series relationship with each other, each effect having a fluid inlet and a fluid outlet; means coupled with the inlet of a first of the effects for directing a feedwater stream thereinto; means coupled with the outlet of a second effect for receiving the feedwater stream thereof and for softening the same, and removing precipitated impurities therefrom to form purified water, the inlet and outlet of each remaining effect being coupled to adjacent effects in said series relationship; vapor formation means for each effect, respectively, for generating water vapor from said purified water; each effect having first means for permitting a first portion of said generated water vapor to combine with the feedwater stream directed thereinto to preheat the feedwater stream before the latter leaves the effect through said fluid outlet thereof, each effect having second means for directing a second portion of the water vapor to a location spaced from the region between the inlet and outlet thereof; and means at said location for condensing the second portion of water vapor to form a distillate.

18. A system as set forth in claim 17, wherein the feedwater is sprayed into each effect and the first portion of water vapor in each effect mixes with the spray and directly contacts the same.

19. A system as set forth in claim 17, wherein the vapor formation means for the second effect is coupled to said treating means.

20. A system as set forth in claim 17, wherein said vapor formation means includes an evaporator.

21. A system as set forth in claim 17, wherein said vapor formation means includes structure defining a first chamber for receiving a flow of heated, pressurized water, whereby the water will flash in the chamber to form water vapor.

* * * * *

UNITED STATES PATENT AND TRADEMARK OFFICE
CERTIFICATE OF CORRECTION

PATENT NO. : 4,018,656
DATED : April 19, 1977
INVENTOR(S) : Alfred N. Rogers, Leon Awerbuch and Jack Z. Abrams It is certified that error appears in the above-identified patent and that said Letters Patent are hereby corrected as shown below:

In column 9, line 68 (last line) change the comma "," to a semicolon -- ; --

In column 10, line 1, before "the" insert -- into --

Signed and Sealed this nineteenth Day of July 1977

[SEAL]

Attest:

RUTH C. MASON
*Attesting Officer*

C. MARSHALL DANN
*Commissioner of Patents and Trademarks*